(12) United States Patent
Surlaker et al.

(10) Patent No.: US 8,464,275 B2
(45) Date of Patent: Jun. 11, 2013

(54) METHOD OF USING A PLURALITY OF SUBSCRIBER TYPES IN MANAGING A MESSAGE QUEUE OF A DATABASE MANAGEMENT SYSTEM

(75) Inventors: Kapil Surlaker, Mountain View, CA (US); Neerja Bhatt, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 956 days.

(21) Appl. No.: 11/471,406

(22) Filed: Jun. 19, 2006

(65) Prior Publication Data

US 2007/0276914 A1 Nov. 29, 2007

Related U.S. Application Data

(60) Provisional application No. 60/799,754, filed on May 10, 2006.

(51) Int. Cl.
*G06F 9/54* (2006.01)

(52) U.S. Cl.
USPC .................. 719/314; 719/313; 719/318

(58) Field of Classification Search
USPC ............. 719/313, 314, 318; 709/201–203, 709/206, 223, 224, 228, 232, 237; 707/2–5, 707/10, 100, 102, 104.1; 718/100, 102, 106
See application file for complete search history.

(56) References Cited

U.S. PATENT DOCUMENTS

| | | | |
|---|---|---|---|
| 5,471,629 A | 11/1995 | Risch | |
| 5,592,664 A | 1/1997 | Starkey | |
| 5,666,486 A | 9/1997 | Alfieri et al. | |
| 5,828,882 A | 10/1998 | Hinckley | |
| 5,881,315 A * | 3/1999 | Cohen | 710/52 |
| 5,999,978 A * | 12/1999 | Angal et al. | 709/229 |
| 6,058,389 A * | 5/2000 | Chandra et al. | 1/1 |
| 6,092,102 A | 7/2000 | Wagner | |
| 6,182,086 B1 | 1/2001 | Lomet et al. | |
| 6,240,453 B1 * | 5/2001 | Chang et al. | 709/226 |

(Continued)

OTHER PUBLICATIONS

Hanson et al., "A Flexible and Recoverable Client/server Database Event Notification System," The VLDB Journal; Springer-Verlag, 1998; pp. 12-24, vol. 7.

(Continued)

*Primary Examiner* — Andy Ho
*Assistant Examiner* — Shih-Wei Kraft
(74) *Attorney, Agent, or Firm* — Kilpatrick Townsend & Stockton LLP

(57) ABSTRACT

A method of using a plurality of subscriber types in managing a message queue of a database management system is described and provided. The method comprises creating a subscriber with a set of rules to the message queue. The subscriber is designated as one or more of the plurality of subscriber types. Moreover, an event notification registration representing a request to be notified if a message to the message queue satisfies the set of rules may be created. In response to a new message for enqueuing to the message queue, it is determined whether the new message satisfies the set of rules. If the new message satisfies the set of rules and if so determined by a triggered event notification registration, a notification is performed according to the triggered event notification registration. A requirement that a receiver of the notification dequeue the new message from the message queue depends on the subscriber type designation.

18 Claims, 4 Drawing Sheets

U.S. PATENT DOCUMENTS

| | | | |
|---|---|---|---|
| 6,292,825 B1* | 9/2001 | Chang et al. | 709/206 |
| 6,427,146 B1 | 7/2002 | Chu | |
| 6,438,705 B1 | 8/2002 | Chao et al. | |
| 6,560,719 B1 | 5/2003 | Pham et al. | |
| 6,757,766 B1* | 6/2004 | Hutner et al. | 710/107 |
| 6,768,994 B1 | 7/2004 | Howard et al. | |
| 6,782,541 B1 | 8/2004 | Cohen et al. | |
| 6,820,136 B1 | 11/2004 | Pham et al. | |
| 6,826,560 B1* | 11/2004 | Leymann et al. | 1/1 |
| 6,829,639 B1* | 12/2004 | Lawson et al. | 709/224 |
| 6,839,748 B1* | 1/2005 | Allavarpu et al. | 709/223 |
| 6,862,595 B1 | 3/2005 | Elko et al. | |
| 6,889,231 B1* | 5/2005 | Souder et al. | 1/1 |
| 6,920,468 B1 | 7/2005 | Cousins et al. | |
| 6,931,405 B2 | 8/2005 | El-Shimi et al. | |
| 7,039,671 B2 | 5/2006 | Cullen | |
| 7,177,859 B2 | 2/2007 | Pather et al. | |
| 7,315,863 B2 | 1/2008 | Kambo et al. | |
| 7,509,415 B2 | 3/2009 | Baekelmans et al. | |
| 7,584,114 B2 | 9/2009 | Estrada et al. | |
| 7,761,413 B2 | 7/2010 | Surlaker et al. | |
| 7,895,600 B2 | 2/2011 | Surlaker et al. | |
| 2001/0000537 A1* | 4/2001 | Inala et al. | 707/500 |
| 2002/0095399 A1* | 7/2002 | Devine et al. | 707/1 |
| 2002/0106070 A1 | 8/2002 | Elsey et al. | |
| 2002/0116248 A1 | 8/2002 | Amit et al. | |
| 2002/0143819 A1* | 10/2002 | Han et al. | 707/513 |
| 2002/0165998 A1 | 11/2002 | Hrebejk et al. | |
| 2002/0184111 A1* | 12/2002 | Swanson | 705/26 |
| 2003/0004952 A1* | 1/2003 | Nixon et al. | 707/10 |
| 2003/0028495 A1* | 2/2003 | Pallante | 705/78 |
| 2003/0055768 A1 | 3/2003 | Anaya et al. | |
| 2003/0055829 A1* | 3/2003 | Kambo et al. | 707/100 |
| 2003/0069959 A1 | 4/2003 | Tse | |
| 2003/0208549 A1* | 11/2003 | El-Shimi et al. | 709/207 |
| 2004/0024794 A1 | 2/2004 | Jain et al. | |
| 2004/0034664 A1 | 2/2004 | Jain et al. | |
| 2004/0064430 A1 | 4/2004 | Klein et al. | |
| 2004/0068481 A1* | 4/2004 | Seshadri et al. | 707/1 |
| 2004/0088401 A1 | 5/2004 | Tripathi et al. | |
| 2004/0123183 A1 | 6/2004 | Tripathi et al. | |
| 2004/0128344 A1 | 7/2004 | Trossen | |
| 2004/0249853 A1 | 12/2004 | Cohen et al. | |
| 2004/0254993 A1* | 12/2004 | Mamas | 709/206 |
| 2005/0003804 A1* | 1/2005 | Huomo et al. | 455/414.1 |
| 2005/0021622 A1* | 1/2005 | Cullen | 709/204 |
| 2005/0021976 A1* | 1/2005 | Trossen | 713/182 |
| 2005/0027742 A1 | 2/2005 | Eichstaedt et al. | |
| 2005/0038772 A1 | 2/2005 | Colrain | |
| 2005/0038791 A1 | 2/2005 | Ven | |
| 2005/0038801 A1 | 2/2005 | Colrain et al. | |
| 2005/0038831 A1 | 2/2005 | Souder et al. | |
| 2005/0038833 A1 | 2/2005 | Colrain et al. | |
| 2005/0038834 A1 | 2/2005 | Souder et al. | |
| 2005/0080819 A1 | 4/2005 | Russell | |
| 2005/0198273 A1 | 9/2005 | Childress et al. | |
| 2005/0203908 A1 | 9/2005 | Lam et al. | |
| 2006/0077454 A1* | 4/2006 | Lum et al. | 358/1.15 |
| 2006/0200501 A1 | 9/2006 | Holenstein et al. | |
| 2006/0209868 A1* | 9/2006 | Callaghan | 370/428 |
| 2006/0235831 A1 | 10/2006 | Adinolfi et al. | |
| 2007/0112885 A1 | 5/2007 | Farr | |
| 2007/0192386 A1 | 8/2007 | Fries et al. | |
| 2007/0214191 A1 | 9/2007 | Chandrasekaran | |
| 2007/0240169 A1 | 10/2007 | Surlaker et al. | |
| 2007/0240170 A1 | 10/2007 | Surlaker et al. | |
| 2007/0250545 A1 | 10/2007 | Surlaker et al. | |
| 2007/0266052 A1 | 11/2007 | Surlaker et al. | |
| 2007/0266393 A1 | 11/2007 | Surlaker et al. | |
| 2008/0098044 A1 | 4/2008 | Todd | |

OTHER PUBLICATIONS

Cyran, "Oracle Database, Concepts, 10g Release 1 (10.1)", Dec. 2003; pp. 1-732.

"Sun One Messaging and Collaboration Event Notification Service Manual," Sun Microsystems, 2002, pp. 1-18.

Non Final Office Action for U.S. Appl. No. 11/401,560 mailed on Jul. 6, 2009; 21 pages.

Non Final Office Action for U.S. Appl. No. 11/401,658 mailed on Jul. 2, 2009; 18 pages.

Final Office Action for U.S. Appl. No. 11/401,658 mailed on Nov. 3, 2009; 22 pages.

Non-Final Office Action for U.S. Appl. No. 11/408,195 mailed on Dec. 17, 2008; 10 pages.

Final Office Action for U.S. Appl. No. 11/408,195 mailed on Jun. 11, 2009; 17 pages.

Advisory Action for U.S. Appl. No. 11/408,195 mailed on Oct. 8, 2009; 3 pages.

Non-Final Office action for U.S. No. Appl. 11/471,167 mailed Aug. 11, 2009; 7 pages.

Non-Final Office Action for U.S. Appl. No. 11/471,405 mailed on May 14, 2008; 13 pages.

Final Office Action for U.S. Appl. No. 11/471,405 mailed on Jan. 23, 2009; 15 pages.

Advisory Action for U.S. Appl. No. 11/471,405 mailed on Apr. 13, 2009; 3 pages.

Non-Final Office action for U.S. Appl. No. 11/471,405 mailed on Jul. 7, 2009; 18 pages.

Final Office Action for U.S. Appl. No. 11/401,560 mailed on Dec. 9, 2009; 27 pages.

Advisory Action for U.S. Appl. No. 11/401,560 mailed on Feb. 23, 2010; 3 pages.

Non-Final Office Action for U.S. Appl. 11/408,195 mailed on Jan. 20, 2010; 11 pages.

Notice of Allowance for U.S. Appl. No. 11/471,405 mailed on Jan. 26, 2010; 8 pages.

Final Office Action for U.S. Appl. No. 11/471,167 mailed on Dec. 15, 2009; 13 pages.

Advisory Action for U.S. Appl. No. 11/471,167 mailed on Feb. 25, 2010; 3 pages.

Notice of Allowance for U.S. Appl. No. 11/471,405 mailed on Apr. 20, 2010; 9 pages.

Muthulingam et al., The Do's and Dont's of Space and Undo Management: Best Practice for Oracle Database 10g, Dec. 2004; pp. 1-34.

Non-Final Office Action for U.S. Appl. No. 11/401,560 mailed on Jun. 4, 2010; 34 pages.

Final Office Action for U.S. Appl. No. 11/408,195 mailed on Jun. 30, 2010; 20 pages.

Non-Final Office Action for U.S. Appl. No. 11/471,167 mailed on Jul. 20, 2010; 13 pages.

Advisory Action for U.S. Appl. No. 11/401,560 mailed on Mar. 4, 2011; 4 pages.

Final Office Action for U.S. Appl. No. 11/401,560 mailed on Dec. 28, 2010; 34 pages.

Notice of Allowance for U.S. Appl. No. 11/471,167 mailed Dec. 6, 2010, 9 pages.

Advisory Action for U.S. Appl. No. 11/408,195 mailed on Sep. 16, 2010; 4 pages.

Advisory Action for U.S. Appl. No. 11/401,560 mailed on Feb. 23, 2010, 4 pages.

Office Action for U.S. Appl. No. 11/401,560 mailed on Sep. 10, 2012.

* cited by examiner

METHOD OF USING A PLURALITY OF SUBSCRIBER TYPES IN MANAGING A MESSAGE QUEUE OF A DATABASE MANAGEMENT SYSTEM

RELATED U.S. APPLICATION

This patent application claims priority to the co-pending provisional patent application, Ser. No. 60/799,764, entitled "DATABASE MANAGEMENT SYSTEM AND METHODS," and with filing date May 10, 2006.

BACKGROUND OF THE INVENTION

1. Field of the Invention

The present invention generally relates to database management systems. More particularly, the present invention relates to using a plurality of subscriber types in managing a message queue of a database management system.

2. Related Art

Typically, a database management system (DBMS) implements a messaging architecture for information sharing in the DBMS. The messaging architecture includes at least one message queue that functions as a repository for messages. A message may be any type of data. Publishers are entities that publish new messages to the message queue. Subscribers are entities that consume messages from the message queue. The DBMS creates subscribers to the message queue in response to requests from clients. The clients can be database users, software programs, etc. Usually, the subscriber is interested in messages that satisfy a set of rules of the subscriber. Moreover, the creation of subscribers generally requires the creation of specific access privileges to the message queue on a per-subscriber basis to maintain security.

Further, the DBMS may allow clients to set up individual event notification registrations to notify the clients when certain DBMS-related events occur. Examples of DBMS-related events include, for example, messages being published to a particular message queue that satisfy the set of rules of a particular subscriber, instances or databases going up or down, database objects changing, and system alerts being issued.

Each event notification registration includes DBMS-related event(s) of interest and the manner of delivering the event notification to the client. For example, delivery may be made over a network to a client specified host and port, may be made by email, may be made by HTTP, or may be made by invocating a stored PL/SQL procedure. To clients, some DBMS-related events of interest are more important than others.

SUMMARY OF THE INVENTION

A method of using a plurality of subscriber types in managing a message queue of a database management system is described and provided. The method comprises creating a subscriber with a set of rules to the message queue. The subscriber is designated as one or more of the plurality of subscriber types. Moreover, an event notification registration representing a request to be notified if a message to the message queue satisfies the set of rules may be created. In response to a new message for enqueuing to the message queue, it is determined whether the new message satisfies the set of rules. If the new message satisfies the set of rules and if so determined by a triggered event notification registration, a notification is performed according to the triggered event notification registration. A requirement that a receiver of the notification dequeue the new message from the message queue depends on the subscriber type designation.

BRIEF DESCRIPTION OF THE DRAWINGS

The accompanying drawings, which are incorporated in and form a part of this specification, illustrate embodiments of the invention and, together with the description, serve to explain the principles of the present invention.

DETAILED DESCRIPTION OF THE INVENTION

Figure 1:
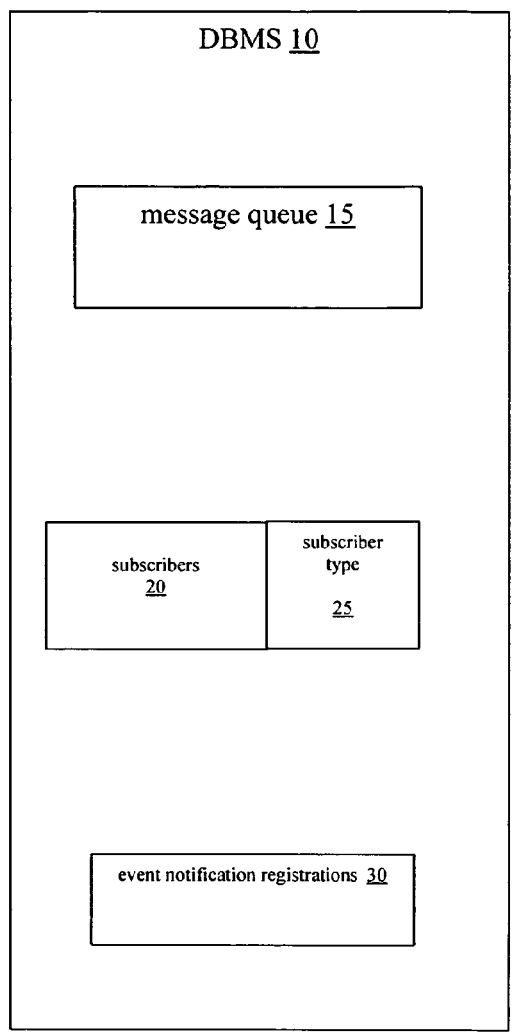
FIG. 1 illustrates a database management system in accordance with an embodiment of the present invention.

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention.

Typically, the DBMS has one subscriber type. On the occurrence of a DBMS-related event of interest (e.g., a new message is published to a particular message queue that satisfies the set of rules of a particular subscriber), a list of event notification registrations that have been triggered is created. That is, the event notification registration represents a request to be notified if a new message to the particular message queue satisfies the set of rules of the particular subscriber. From the list, notifications are made to clients as specified in the event notification registrations. Usually, the receiver of the notification is required to connect back to the DBMS in order to access the new message and to dequeue the new message from the message queue.

Sometimes a single message queue might hold multiple kinds of messages. Some of these messages are meant for consumption by a large number of clients (e.g., database users, software programs, etc.). In effect, these are public-type messages. Other messages are regarded as highly secure and are only meant for a limited number of clients with special access privileges. In effect, these are private-type messages. For reasons of efficiency, it is advantageous to have the public-type messages and the private-type messages in a single message queue. However, for security reasons, the clients interested in the public-type messages should be allowed access to the public-type messages and denied access to the private-type messages.

In another situation, there might be a large number of clients who might be interested in certain messages of the message queue. Some of these clients may be applications running remotely. Typically, a subscriber to the message queue has to be created for each client. Moreover, after being notified of a new message of interest in the message queue, each client has to dequeue the message as the subscriber. Since the new message is meant for a large number of clients, it is necessary to create a large number of subscribers (one per dequeuing client) so that the DBMS can accurately track and decide when the new message may be removed from the message queue to ensure that the new message is available to clients interested in it. However, it may be inconvenient or impossible to create specific access privileges to a message queue on a per-subscriber basis in cases where there are a substantial number of clients requesting access to the message queue. But, if a single subscriber had been created, one client could dequeue the new message from the message queue and make the new message unavailable to other clients interested in it.

In contrast, the invention enables several subscriber types for managing a message queue of a database management system. As a result, solutions to the problems discussed above are provided. Since several subscriber types are available, a created subscriber may be designated as one or more of the subscriber types.

In an embodiment, a notification only subscriber is one of the subscriber types. If a subscriber to a message queue is designated as a notification only subscriber, a client notified of messages that satisfy the subscriber's set of rules in the message queue is not required to connect back to the DBMS in order to access the messages and to dequeue the messages from the message queue, eliminating tasks that may be inconvenient or inefficient for the client to perform. Instead, the client is able get the messages sent to it by the DBMS. Moreover, the client may simple get delivery of the notification if that is what it only wants.

Further, a public subscriber is another of the subscriber types. As discussed above, the creation of a subscriber typically requires creating specific access privileges to a message queue on a per-subscriber basis. If a subscriber is designated as a public subscriber, the subscriber does not need to be granted specific access privileges to the message queue on a per-subscriber basis. Moreover, by also designating the subscriber as a notification only subscriber, a client notified of messages that satisfy the subscriber's (which is designated as a public subscriber and as a notification only subscriber) set of rules in the message queue does not have access privileges to the message queue, ensuring security is maintained, and can only get messages that are sent to it by the DBMS. By placing responsibility on the message queue owner for creating subscribers designated as public subscribers, the subscriber is created with the proper set of rules to ensure that only appropriate messages (described above as public-type messages) are made available to subscribers designated as public subscribers.

FIG. 1 illustrates a database management system (DBMS) 10 in accordance with an embodiment of the present invention. The DBMS 10 includes a message queue 15. The message queue 15 may be implemented in volatile memory or in a database for persistent storage within the DBMS 10. Moreover, the DBMS 10 has subscribers 20 for the message queue 15 and the subscriber type(s) 25 for each subscriber 20. A subscriber 20 may be designated as one or more of the subscriber types. Also, the DBMS 10 includes event notification registrations 30. The subscribers 20, the subscriber type(s) 25, and event notification registrations 30 may be implemented in volatile memory or in a database for persistent storage within the DBMS 10.

Each subscriber 20 has a set of rules that specify messages of interest to the subscriber 20 from the messages published to the message queue 15. The rules may be based on any thing associated with a message. Data type, publisher, subject matter, and priority are examples on which the rules may be based.

In an embodiment, the subscriber types include ordinary subscriber, notification only subscriber, and public subscriber. For the ordinary subscriber, specific access privileges to the message queue 15 are created on a per-subscriber basis to maintain security. Moreover, notifications based on event notification registrations 30 triggered by messages of interest to ordinary subscribers require the receiver of the notification to dequeue the message from the message queue 15.

For the notification only subscriber, specific access privileges to the message queue 15 on a per-subscriber basis are generally not necessary. Moreover, notifications based on event notification registrations 30 triggered by messages of interest to notification only subscribers do not require the receiver of the notification to dequeue the message from the message queue 15. The receiver of the notification is able get the message sent to it by the DBMS. The message is automatically dequeued from the message queue 15 at an appropriate time by the DBMS 10.

For the public subscriber, specific access privileges to the message queue 15 on a per-subscriber basis are not created. Moreover, notifications based on event notification registrations 30 triggered by messages of interest to public subscribers do not require the receiver of the notification to dequeue the message from the message queue 15 since no specific access privileges were ever created. By also designating the subscriber as a notification only subscriber, a client notified of messages that satisfy the subscriber's (which is designated as a public subscriber and as a notification only subscriber) set of rules in the message queue does not have access privileges to the message queue, ensuring security is maintained, and can only get messages that are sent to it by the DBMS. The message is automatically dequeued from the message queue 15 at an appropriate time by the DBMS 10.

Figure 2:
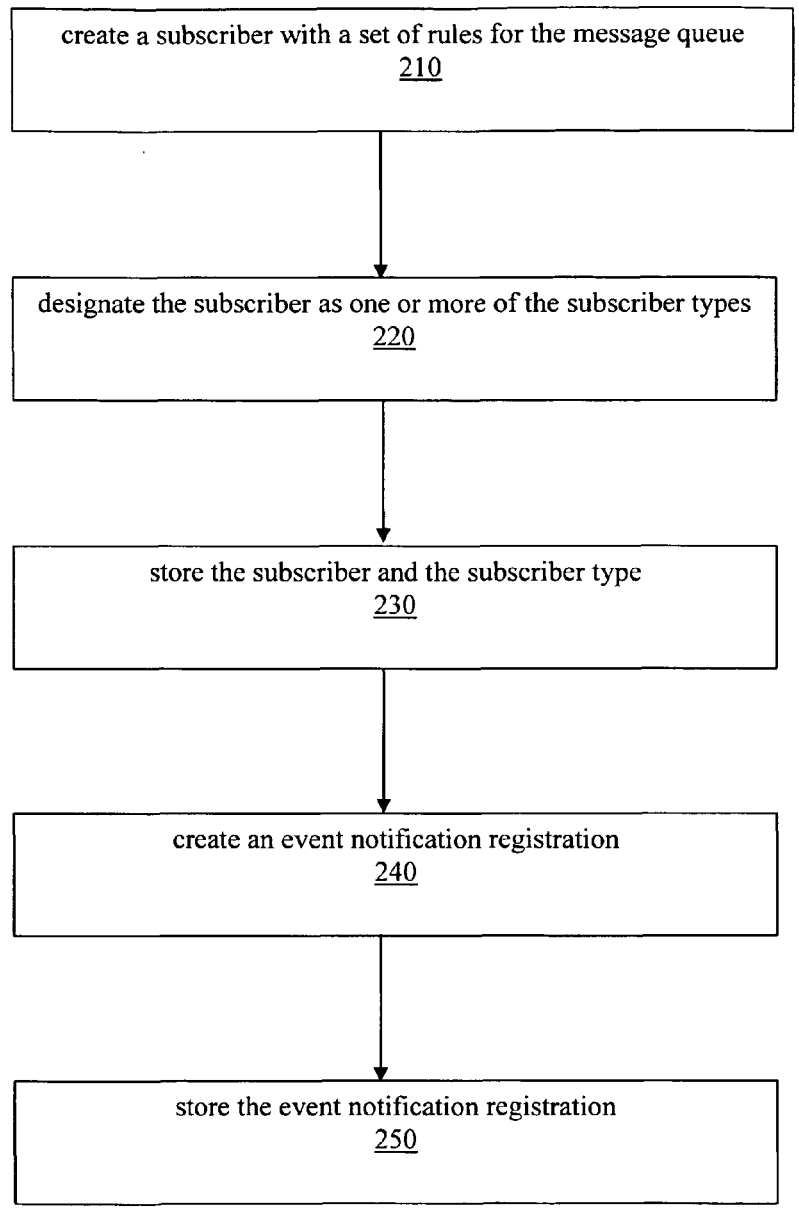
FIGS. 2 and 3 illustrate a method of using a plurality of subscriber types in managing a message queue of a database management system in accordance with an embodiment of the present invention.
Figure 3:
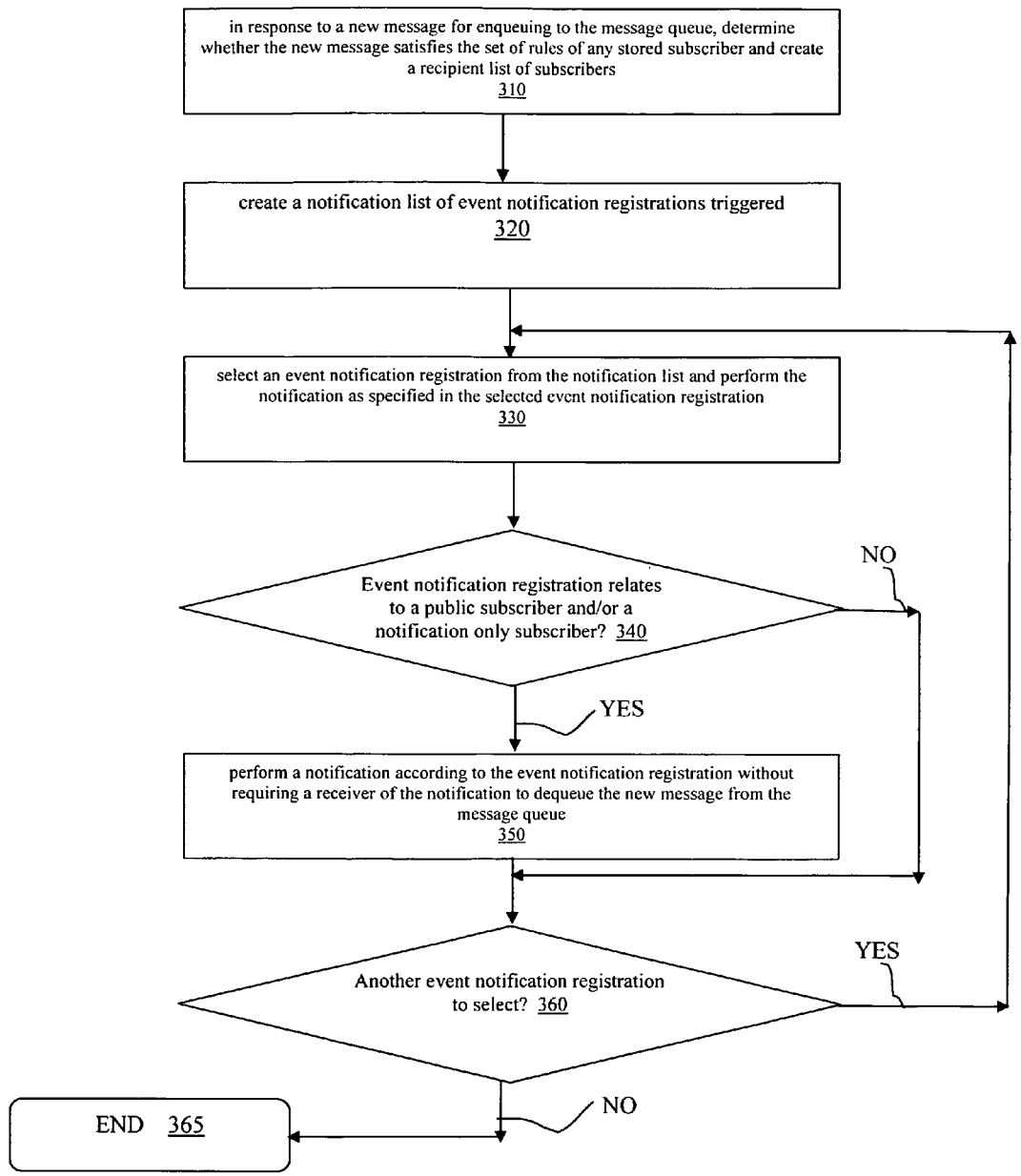

FIGS. 2 and 3 illustrate a method of using a plurality of subscriber types in managing a message queue of a database management system in accordance with an embodiment of the present invention. Reference is made to FIG. 1.

Focusing on FIG. 2, at Block 210, a subscriber 20 with a set of rules is created for the message queue 15. At Block 220, the subscriber 20 is designated as one or more of the subscriber types (e.g., ordinary subscriber, notification only subscriber, and public subscriber). In an embodiment, public subscribers may only be created by the message queue owner of the message queue 15.

Continuing, at Block 230, the subscriber 20 and the subscriber type(s) 25 are stored.

At Block 240, an event notification registration 30 is created. Further, at Block 250, the event notification registration 30 is stored.

Referring to FIG. 3, at Block 310, in response to a new message for enqueuing to the message queue 15, it is determined whether the new message satisfies the set of rules of any stored subscriber 20. Moreover, a recipient list of subscribers is created, wherein the recipient list includes subscribers who have set of rules that are satisfied by the new message.

At Block 320, a notification list of event notification registrations is created. An event notification registration represents a request to be notified if a new message to the message queue 15 satisfies the set of rules of a particular subscriber. The notification list includes event notification registrations triggered by the new message.

Further, at Block 330, an event notification registration is selected from the notification list and notification is performed as specified in the selected event notification registration.

Continuing, at Block 340, it is determined whether the event notification registration relates to a public subscriber and/or a notification only subscriber.

If the event notification registration relates to a public subscriber and/or a notification only subscriber, a notification is performed according to the event notification registration without requiring a receiver of the notification to dequeue the new message from the message queue 15, at Block 350. If needed, the new message is sent to the receiver of the notification by the DBMS 10. The new message is automatically dequeued from the message queue 15 at an appropriate time by the DBMS 10.

At Block 360, it is determined whether there is another event notification registration to select from the notification list. If there is another event notification registration to select from the notification list, selection of another event notification registration occurs at Block 330. Otherwise, selection of an event notification registration is terminated, at Block 365.

In an embodiment, the invention is configured as computer-executable instructions stored in a computer-readable medium, such as a magnetic disk, CD-ROM, an optical medium, a floppy disk, a flexible disk, a hard disk, a magnetic tape, a RAM, a ROM, a PROM, an EPROM, a flash-EPROM, or any other medium from which a computer can read.

Figure 4:
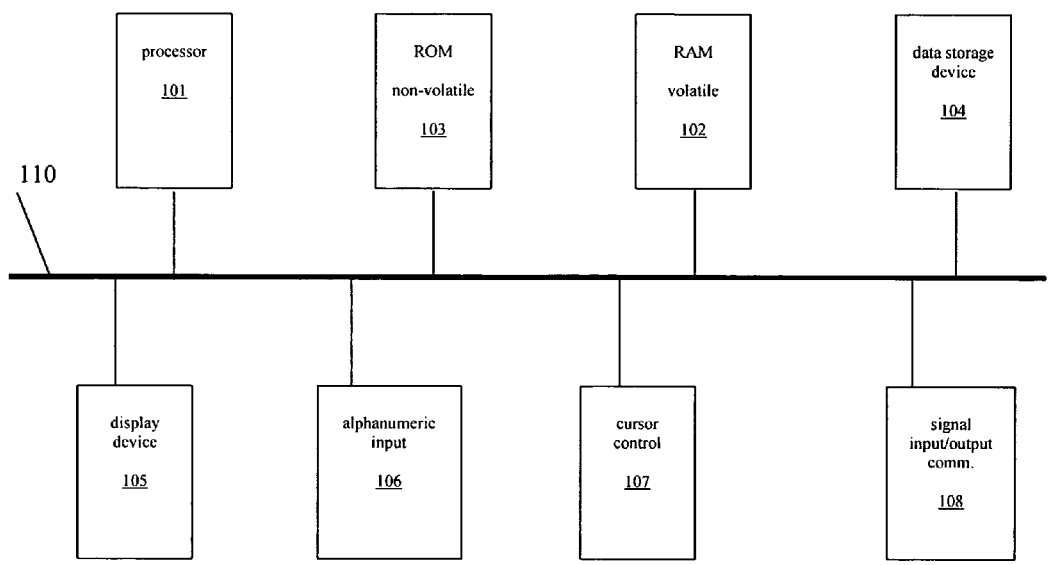
FIG. 4 illustrates an exemplary computer system on which embodiments of the present invention may be practiced.

FIG. 4 illustrates an exemplary computer system 400 on which embodiments of the present invention may be practiced. Aspects of the present invention can be implemented or executed on a computer system or any other computational system. Although a variety of different computer systems can be used with the present invention, an exemplary computer system 400 is shown in FIG. 4.

With reference to FIG. 4, portions of the present invention are comprised of computer-readable and computer executable instructions which reside, for example, in computer-usable media of an electronic system such as the exemplary computer system 400. FIG. 4 illustrates an exemplary computer system 400 on which embodiments of the present invention may be practiced. It is appreciated that the computer system 400 of FIG. 4 is exemplary only and that the present invention can operate within a number of different computer systems including general-purpose computer systems and embedded computer systems.

Computer system 400 includes an address/data bus 110 for communicating information, a central processor 101 coupled with bus 110 for processing information and instructions, a volatile memory 102 (e.g., random access memory RAM) coupled with the bus 110 for storing information and instructions for the central processor 101 and a non-volatile memory 103 (e.g., read only memory ROM) coupled with the bus 110 for storing static information and instructions for the processor 101. Exemplary computer system 400 also includes a data storage device 104 ("disk subsystem") such as a magnetic or optical disk and disk drive coupled with the bus 110 for storing information and instructions. Data storage device 104 can include one or more removable magnetic or optical storage media (e.g., diskettes, tapes), which are computer-readable memories. Memory units of computer system 400 include volatile memory 102, non-volatile memory 103 and data storage device 104.

Exemplary computer system 400 can further include a signal input/output communication device 108 (e.g., a network interface card "NIC") coupled to the bus 110 for interfacing with other computer systems. Also included in exemplary computer system 400 of FIG. 4 is an alphanumeric input device 106 including alphanumeric and function keys coupled to the bus 110 for communicating information and command selections to the central processor 101. Exemplary computer system 400 also includes a cursor control or directing device 107 coupled to the bus 110 for communicating user input information and command selections to the central processor 101. A display device 105 can also be coupled to the bus 110 for displaying information to the computer user. Display device 105 may be a liquid crystal device, other flat panel display, cathode ray tube, or other display device suitable for creating graphic images and alphanumeric characters recognizable to the user. Cursor control device 107 allows the user to dynamically signal the two-dimensional movement of a visible symbol (cursor) on a display screen of display device 105. Many implementations of cursor control device 107 are known in the art including a trackball, mouse, touch pad, joystick or special keys on alphanumeric input device 106 capable of signaling movement of a given direction or manner of displacement. Alternatively, it will be appreciated that a cursor can be directed and/or activated via input from alphanumeric input device 106 using special keys and key sequence commands.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method comprising:
creating, by executing instructions via a processor, a subscriber with a set of rules to a message queue of a database management system;
designating, by executing instructions via the processor, said subscriber as being of a first subscriber type that is to dequeue messages or of a second subscriber type that is not to dequeue messages, wherein specific access privileges to the message queue are created on a per-subscriber basis for subscribers designated as the first subscriber type and wherein subscribers designated as the second type avoid the need for creation of specific access privileges to said message queue in addition to said set of rules;
creating, by executing instructions via the processor, an event notification registration representing a request to be notified if a message to be enqueued to said message queue satisfies said set of rules;
in response to a new message for enqueuing to said message queue, determining, by executing instructions via the processor, whether said new message satisfies said set of rules;
when said new message satisfies said set of rules and if any event notification registration is triggered, performing, by executing instructions via the processor, a notification according to said triggered event notification registration,
wherein a dequeuing requirement that a receiver of said notification dequeue said new message from said message queue depends on whether said receiver is of the first subscriber type that is to dequeue messages, and
wherein said receiver of said notification is required to dequeue said new message from said message queue if said subscriber is designated as the first subscriber type.

2. The method as recited in claim 1 further comprising: automatically dequeuing said new message from said message queue at an appropriate time.

3. The method as recited in claim 1 wherein said subscriber types include a public subscriber, and wherein, for the public subscriber, specific access privileges to the message queue on a per-subscriber basis are not created.

4. The method as recited in claim 1 wherein said subscriber types include a notification only subscriber.

5. The method as recited in claim 1 wherein said subscriber types include an ordinary subscriber, and wherein, for the ordinary subscriber, specific access privileges to the message queue are created on a per-subscriber basis.

6. The method as recited in claim 1, wherein a receiver of said notification is configured to not dequeue said new message from said message queue when said receiver is a subscriber designated as a type that is not to dequeue messages.

7. The method as recited in claim 1, said method further comprising:
dequeueing, by executing instructions via the processor, said new message from said message queue and sending, by a database management system, said new message to said receiver if said event notification registration is related to a subscriber of a type that is not to dequeue messages.

8. A non-transitory computer-readable medium comprising computer-executable instructions stored therein for performing a method of using a plurality of subscriber types in managing a message queue of a database management system, said method comprising:
creating a subscriber with a set of rules to said message queue;
designating said subscriber as one or more of said plurality of subscriber types, wherein a first subscriber type in the plurality of subscriber types is to dequeue messages and a second subscriber type in the plurality of subscriber types is not to dequeue messages, wherein specific access privileges to the message queue are created on a per-subscriber basis for subscribers designated as the first subscriber type and wherein subscribers designated as the second type avoid the need for creation of specific access privileges to said message queue in addition to said set of rules;
creating an event notification registration representing a request to be notified if a message to be enqueued to said message queue satisfies said set of rules;
in response to a new message for enqueuing to said message queue, determining whether said new message satisfies said set of rules;
if said new message satisfies said set of rules and if any event notification registration is triggered, performing a notification according to said triggered event notification registration, wherein a dequeuing requirement that a receiver of said notification dequeue said new message from said message queue depends on whether said receiver is of the first subscriber type that is to dequeue messages; and
wherein said receiver of said notification is required to dequeue said new message from said message queue if said subscriber is designated as the first subscriber type.

9. The computer-readable medium as recited in claim 8 further comprising:
automatically dequeuing said new message from said message queue at an appropriate time.

10. The computer-readable medium as recited in claim 8 wherein said subscriber types include a public subscriber, and wherein, for the public subscriber, specific access privileges to the message queue on a per-subscriber basis are not created.

11. The computer-readable medium as recited in claim 8 wherein said subscriber types include a notification only subscriber.

12. The computer-readable medium as recited in claim 8 wherein said subscriber types include an ordinary subscriber, and wherein, for the ordinary subscriber, specific access privileges to the message queue are created on a per-subscriber basis.

13. An apparatus comprising:
a memory comprising instructions stored therein; and
a processor for executing said instructions to perform a method of using a plurality of subscriber types in managing a message queue of a database management system, said method comprising:
creating a subscriber with a set of rules to said message queue;
designating said subscriber as one or more of said plurality of subscriber types, wherein a first subscriber type in the plurality of subscriber types is to dequeue messages and a second subscriber type in the plurality of subscriber types is not to dequeue messages, wherein specific access privileges to the message queue are created on a per-subscriber basis for subscribers designated as the first subscriber type and wherein subscribers designated as the second type avoid the need for creation of specific access privileges to said message queue in addition to said set of rules;
creating an event notification registration representing a request to be notified if a message to be enqueued to said message queue satisfies said set of rules;
in response to a new message for enqueuing to said message queue, determining whether said new message satisfies said set of rules;
if said new message satisfies said set of rules and if any event notification registration is triggered, performing a notification according to said triggered event notification registration, wherein a dequeuing requirement that a receiver of said notification dequeue said new message from said message queue depends on whether said receiver is of the first subscriber type that is to dequeue messages; and
wherein said receiver of said notification is required to dequeue said new message from said message queue if said subscriber is designated as the first subscriber type.

14. The apparatus as recited in claim 13 further comprising: automatically dequeuing said new message from said message queue at an appropriate time.

15. The apparatus as recited in claim 13 wherein said subscriber types include a public subscriber, and wherein, for the public subscriber, specific access privileges to the message queue on a per-subscriber basis are not created.

16. The apparatus as recited in claim 13 wherein said subscriber types include a notification only subscriber.

17. The apparatus as recited in claim 13 wherein said subscriber types include an ordinary subscriber, and wherein, for the ordinary subscriber, specific access privileges to the message queue are created on a per-subscriber basis.

18. A method comprising:
maintaining, by executing instructions via a processor, a message queue and a list of subscribers to the message queue, each subscriber having a subscriber type and a set of rules,
designating, by executing instructions via the processor, each of said subscribers as being of a first subscriber type that is to dequeue messages or of a second subscriber type that is not to dequeue messages, wherein specific access privileges to the message queue are created on a per-subscriber basis for subscribers designated as the first subscriber type and wherein subscribers designated as the second type avoid the need for creation of specific access privileges to said message queue in addition to said set of rules;

maintaining, by executing instructions via the processor, a set of event notification registrations, each event notification registration identifying a subscriber in the list of subscribers to be notified if a message to be enqueued to the message queue satisfies the subscriber's set of rules;

receiving, by executing instructions via the processor, a message to be enqueued to the message queue;

determining, by executing instructions via the processor, an event notification registration in the set of event notification registrations that is triggered by the receiving of the message;

determining, by executing instructions via the processor, whether the event notification registration identifies a subscriber that is of the type that is configured to dequeue messages; and performing, by executing instructions via the processor, a notification according to the event notification registration; wherein a dequeuing requirement that a receiver of said notification dequeue said new message from said message queue depends on whether said receiver is of the first subscriber type that is configured to dequeue messages, and wherein said receiver of said notification is required to dequeue said new message from said message queue if said subscriber is designated as the first subscriber type.

* * * * *

UNITED STATES PATENT AND TRADEMARK OFFICE
CERTIFICATE OF CORRECTION

PATENT NO. : 8,464,275 B2
APPLICATION NO. : 11/471406
DATED : June 11, 2013
INVENTOR(S) : Surlaker et al.

It is certified that error appears in the above-identified patent and that said Letters Patent is hereby corrected as shown below:

In the Specification

In column 1, line 9, delete "Ser. No. 60/799,764" and insert -- Ser. No. 60/799,754 --, therefor.

In the Claims

In column 7, line 21, in Claim 7, delete "dequeueing" and insert -- dequeuing --, therefor.

Signed and Sealed this
Fifteenth Day of October, 2013

Teresa Stanek Rea
*Deputy Director of the United States Patent and Trademark Office*